United States Patent
Kalinka

(10) Patent No.: US 10,618,663 B2
(45) Date of Patent: Apr. 14, 2020

(54) INTELLIGENT PARACHUTE RESCUE SYSTEM FOR MANNED AND UNMANNED AERIAL VEHICLES

(71) Applicant: KAPI electronics GmbH, Eberswalde (DE)

(72) Inventor: Holger Kalinka, Eberswalde (DE)

(73) Assignee: KAPI electronics GmbH, Eberswalde (DE)

( * ) Notice: Subject to any disclaimer, the term of this patent is extended or adjusted under 35 U.S.C. 154(b) by 232 days.

(21) Appl. No.: 15/556,649

(22) PCT Filed: Mar. 10, 2016

(86) PCT No.: PCT/DE2016/100108
§ 371 (c)(1),
(2) Date: Sep. 8, 2017

(87) PCT Pub. No.: WO2016/141928
PCT Pub. Date: Sep. 15, 2016

(65) Prior Publication Data
US 2018/0050805 A1    Feb. 22, 2018

(30) Foreign Application Priority Data

Mar. 10, 2015    (DE) .................... 20 2015 001 833 U

(51) Int. Cl.
*B64D 17/72*    (2006.01)
*B64D 17/80*    (2006.01)
(Continued)

(52) U.S. Cl.
CPC ............. *B64D 17/72* (2013.01); *B64D 17/80* (2013.01); *B64D 25/12* (2013.01); *B64D 45/00* (2013.01);
(Continued)

(58) Field of Classification Search
CPC .... B64D 17/72; B64D 17/80; B64C 2201/185
See application file for complete search history.

(56) References Cited

U.S. PATENT DOCUMENTS 1,802,325 A * 4/1931 Broadwick ............ B64D 25/12
244/142
3,097,819 A    7/1963 Raistakka
(Continued)

FOREIGN PATENT DOCUMENTS

DE    102011053678 A1    3/2013
GB          1079098 A *    8/1967 .............. F42B 10/06
(Continued)

OTHER PUBLICATIONS

Pleasants, James. Parachute Mortar Design. Journal of Spacecraft, vol. 11, No. 4, pp. 246-251. Apr. 1974. (Year: 1974).*
(Continued)

*Primary Examiner* — Philip J Bonzell
*Assistant Examiner* — Michael B. Kreiner
(74) *Attorney, Agent, or Firm* — Smartpat PLC

(57) ABSTRACT

The invention relates to a method and a device for an intelligent parachute rescue system for manned and unmanned aerial vehicles (14), wherein no pyrotechnic propellants are used, but compressed air (4a) extracted from a pressure bottle (4).

7 Claims, 5 Drawing Sheets

(51) Int. Cl.
   *B64D 25/12*   (2006.01)
   *B64D 45/00*   (2006.01)
   *B64C 39/02*   (2006.01)

(52) U.S. Cl.
   CPC ...... *B64C 39/024* (2013.01); *B64C 2201/185* (2013.01); *B64D 2045/0085* (2013.01)

(56) References Cited

U.S. PATENT DOCUMENTS

| | | | | |
|---|---|---|---|---|
| 3,282,539 | A | * | 11/1966 | Wiant ................. B64G 1/62 102/348 |
| 3,799,480 | A | * | 3/1974 | Dereng ................. B64D 17/52 244/147 |
| 4,709,884 | A | * | 12/1987 | Gustafson ............. B64D 17/80 244/139 |
| 5,810,293 | A | | 9/1998 | Leeki-Woo |
| 6,164,595 | A | * | 12/2000 | Williams ............... B64D 17/80 244/139 |
| 2011/0315806 | A1 | * | 12/2011 | Piasecki ................. G05D 1/102 244/2 |

FOREIGN PATENT DOCUMENTS

| | | | | |
|---|---|---|---|---|
| GB | 1214875 | A | | 12/1970 |
| GB | 1221790 | A | * | 2/1971 ........... B64D 17/383 |
| WO | 2011002517 | A3 | | 3/2011 |

OTHER PUBLICATIONS

Whalley, Ian. Parachute Mortars; an Engineering Review. 44th AIAA/ASME/SAE/ASEE Joint Propulsion Conference & Exhibit. Jul. 23, 2008. (Year: 2003).*

Koster, Steve; John Wells; Rob Sinclair. Pneumatic Mortar Development for the NASA/Orion Capsule Drogue Parachute System. 21st AIAA Aerodynamic Decelerator Systems Technology Conference and Seminar May 26, 2011. AIAA 2011-2598. (Year: 2011).*

International Preliminary Report on Patentability in International Application PCT/DE2016/100108, dated Sep. 12, 2017.

* cited by examiner

INTELLIGENT PARACHUTE RESCUE SYSTEM FOR MANNED AND UNMANNED AERIAL VEHICLES

TECHNICAL FIELD

The present disclosure relates to a parachute rescue systems for manned and unmanned aerial vehicles.

BACKGROUND

Despite constantly improved quality of aerial vehicle and increased air safety, breakdowns and accidents can occur again and again. It is becoming increasingly important to return the damaged aerial vehicle safely to the earth. First and foremost is the rescue of human life. Rescue systems are currently installed in ultralight aircraft. For quite some time, however, it has also been possible to equip airplanes having a take-off mass larger than 450 kg with a parachute rescue system similar to ultra-light aircraft which lowers the entire airplane to the ground without harm to the occupants. In the case of engine failure, non-controllability and/or a collision over difficult terrain, the parachute is a significant safety factor and possibly the only solution to air rescue. There are already many examples of successful "landings" using parachute rescue systems for aerial vehicle.

Unfortunately, these rescue systems are mainly associated with pyrotechnic systems (rockets), which are launched when the rescue is activated, pulling the parachute from a package or container, which in turn is attached to the aerial vehicle. Manned and unmanned aerial vehicle are thus practically out and about primed with a rocket. The launch of the rocket is associated with a jet of fire, which can also damage the sensitive parachute cap. The same applies to chemical fuels. Even after a flight accident, the relief and rescue workers constantly have problems defusing the pyrotechnics not activated during the rescue to avoid getting themselves into danger.

SUMMARY

The object of the invention is to find an intelligent parachute rescue system for manned and unmanned aerial vehicle without the use of pyrotechnic propellants. The object is achieved according to the invention as described in the claims.

An intelligent parachute rescue system for manned and unmanned aerial vehicle was developed in such a way that
  that the flight and engine data of the aerial vehicle are collected and evaluated by means of a data logger, and through this, a manual activation and/or an automatic activation of the parachute container is executed,
  that after the capture of the flight and engine data and the evaluation of the data logger, a remote transmission is used and thus a wireless remote activation takes place for the deployment of the parachute container,
  that after the parachute container has been activated, defined and directed compacted compressed air from a pressure cylinder is optimized in such a way that the parachute container is deployed in a controlled manner using the emergency parachute lying within,
  that a parachute container consisting of a rescue capsule having an emergency parachute and an auxiliary parachute is provided and the rescue capsule is provided in a compressed air container of the parachute container and an activation function takes place via a connected pressure cylinder with compressed air and a control valve between the pressure cylinder and the compressed air container of the parachute container,
  that an emergency parachute is enclosed in a multi-part, non-fixed capsule provided with several sliding rings, which in turn is integrated into an adapted parachute container in order to deploy it by means of compacted compressed air,
  that an emergency parachute is packaged in such a way that it is integrated into the adapted parachute container by means of an adjoining flexible, slidable packaging system which is equipped with predetermined break points, in order to deploy it by means of compacted compressed air.

In addition, a data logger can be used for the measurement data capture of flight and engine data in order to optimally control the deployment of the emergency parachute. This data logger system having switching outputs is advantageously connected to a control valve between parachute container and compressed air cylinder.

The system according to the invention is preferably used wherever parachute rescue systems are applied by means of pyrotechnic or chemical motors and/or propellants.

Technical functionalities and parameters:
intelligent system
no dangerous fuels
fast and simple operating principle
no complex mechanical constructions which could hinder the safe deployment of the rescue technology
better control of the fuel through display
uncomplicated prescribed maintenance possible
protection of the parachute cap and its systems against heat and/or chemical fuels
environmentally friendly fuels
safe defusing of the parachute rescue system.

BRIEF DESCRIPTION OF THE DRAWINGS

An exemplary embodiment is described in the following with reference to the figures.

The figures show.

DETAILED DESCRIPTION

A method for operating an intelligent parachute rescue system is based on the use of compressed air to deploy an emergency parachute 3 for an aerial vehicle 14.

Figure 5:
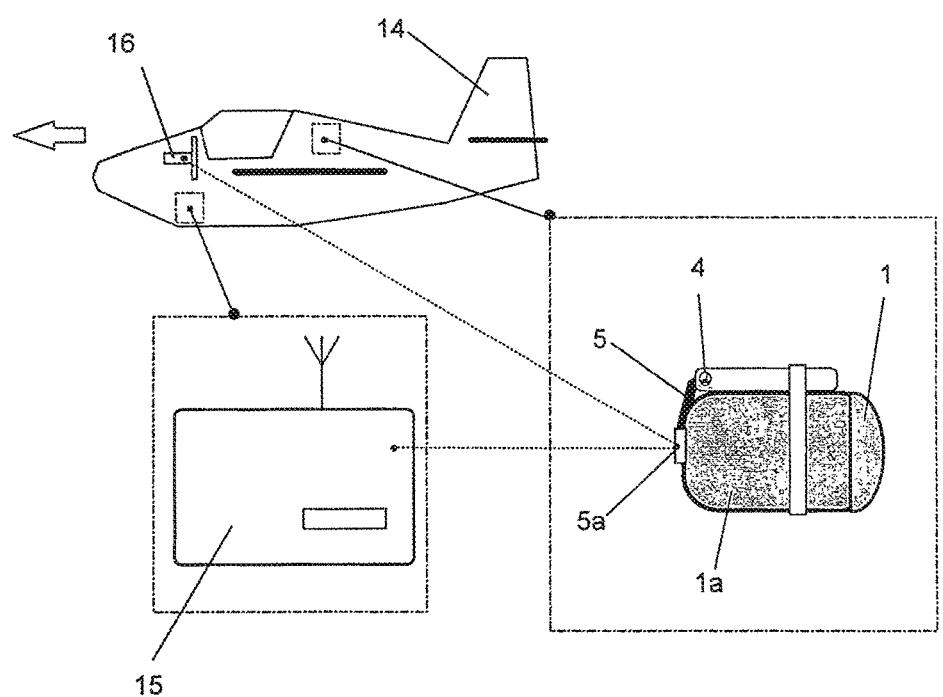

A possible, additional data logger (FIG. 5) 15 for the capture of GPS data, such as ground speed (GS) and altitude, forwards these detected data via switching outputs to a control valve which is switched between the compressed air bottle and the compressed air container into which the parachute container 77 is integrated. The data logger (FIG. 5) 15 may also include acceleration sensors and/or attitude sensors.

In the case of danger, the system (FIG. 5) can be activated manually 16 and/or automatically via the control valve 5a. Furthermore, a certain air volume is "maintained" in the control valve 5a in order to enable an optimal and rapid activation. At the same time, negative temperature behavior is counteracted by air expansion. In the case of automatic activation, this can also be remotely controlled in the aerial vehicle in the case of unmanned aerial vehicle (UAV) by means of radio contact to the data logger (FIG. 5) 15. The data logger (FIG. 5) 15 is in this case equipped with a GSM/Sat or radio receiver. The data logger (FIG. 5) 15 additionally provides all relevant information for the decision on air rescue.

Figure 1:
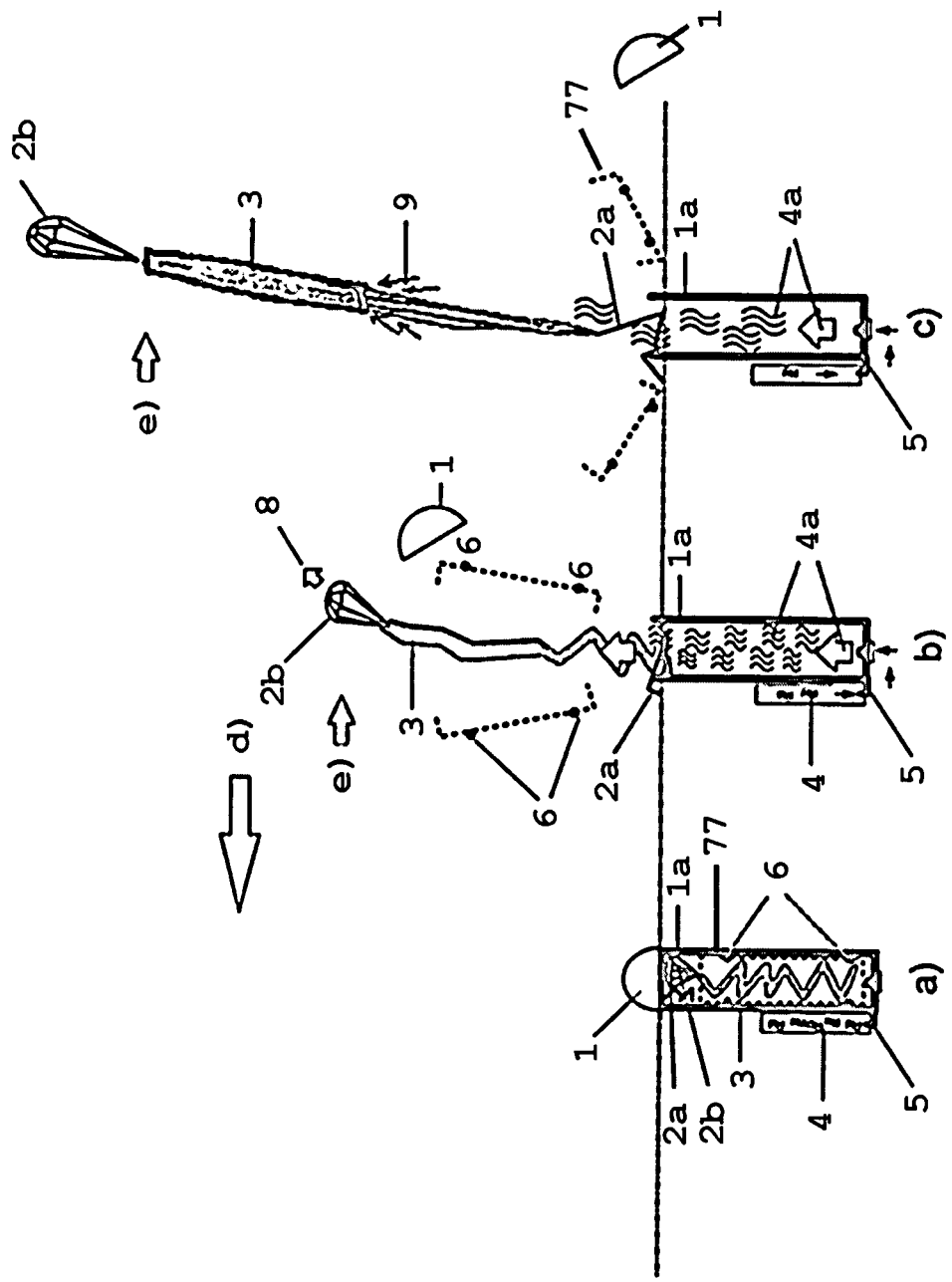
FIG. 1 the functioning of the parachute container 77
  FIG. 2 the parachute container 77
  FIG. 3 the arrangement of the parachutes in the rescue capsule 20
  FIG. 4 the arrangement of the parachutes in the rescue capsule 20
  FIG. 5 the connection data logger 15 with parachute container 77 and aerial vehicle 14.
Figure 2:
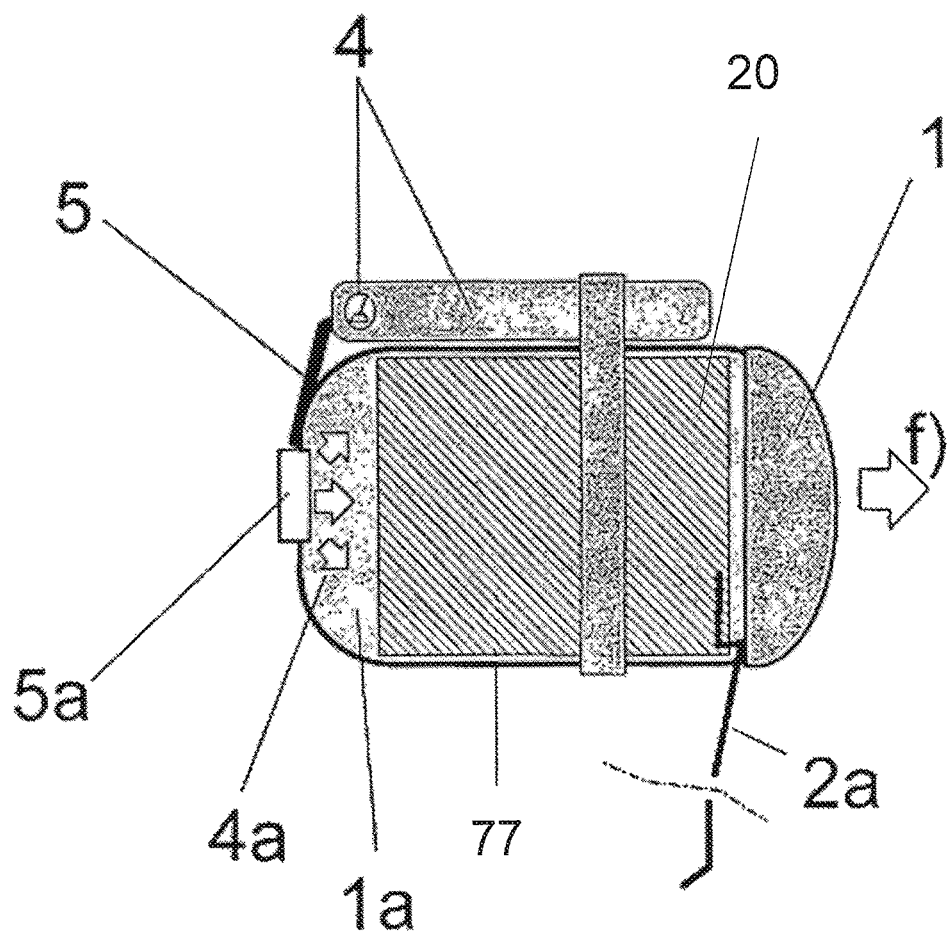

The control valve 5a can therefore advantageously also be referred to in the embodiment as an electronic control valve, which is directly connected electrically to the manual release 16 or the switching outputs of the data logger 15. The compacted compressed air in the pressure cylinder (FIG. 1) 4; (FIG. 2) 4, including the pressure indicator on the compressed air container 1a, which is coordinated with the parachute container 77, presses after activation via the direct compressed air bottle outlet opening (FIG. 1) 5; (FIG. 2) 5; (FIG. 5) 5 into the compressed-air container 1a via the control valve 5a. In this case, the connection between the pressure cylinder 4 and the compressed air container 1a must be adapted to the rapidly expanding air mass and the icing resulting therefrom. An auxiliary parachute (FIG. 1) 2b advantageously having an internal expansion spring is tensioned in the resting state (FIG. 1) a) on the system and is fixedly connected to the cap top of the emergency parachute 3.

A container hood 1, which is not fixedly connected to the parachute container 77, advantageously made of light plastic material, closes the parachute container 77 with an internal rescue capsule 20.

When the system is activated, (FIG. 1) b), the penetrating compressed air 4a presses on the rescue capsule 20 with an internal emergency parachute 3 and ejects it from the compressed air container 1a. The container hood 1 is pushed away, and the auxiliary parachute 2b can expand or be released. With an additional pulling force 8 using given inflows e) and the given flight direction d), the auxiliary parachute simultaneously helps to tightening the opening emergency parachute (FIG. 1) c) 3, so that air 9 rapidly streaming in can fill the emergency parachute.

Figure 3:
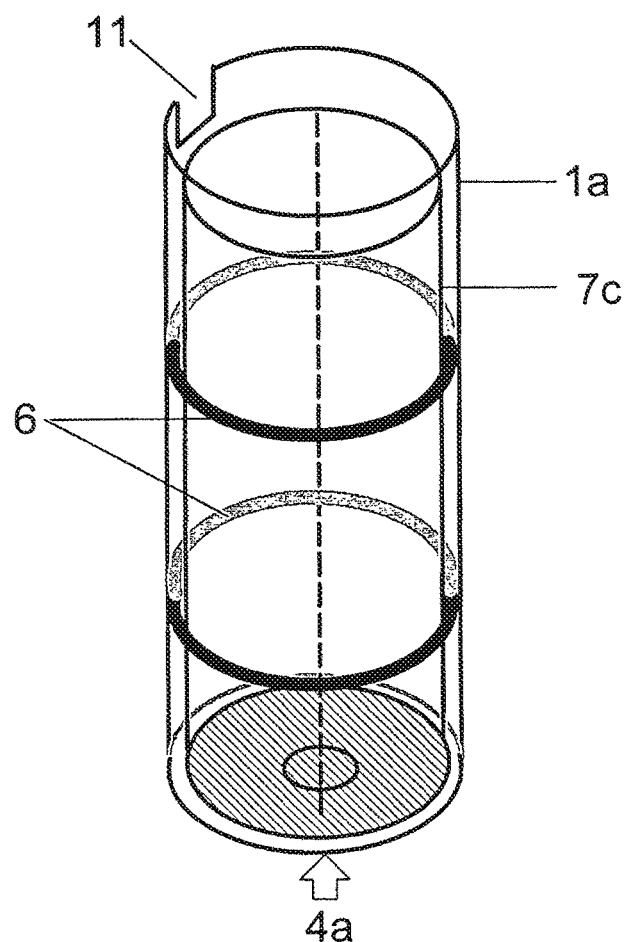
Figure 4:
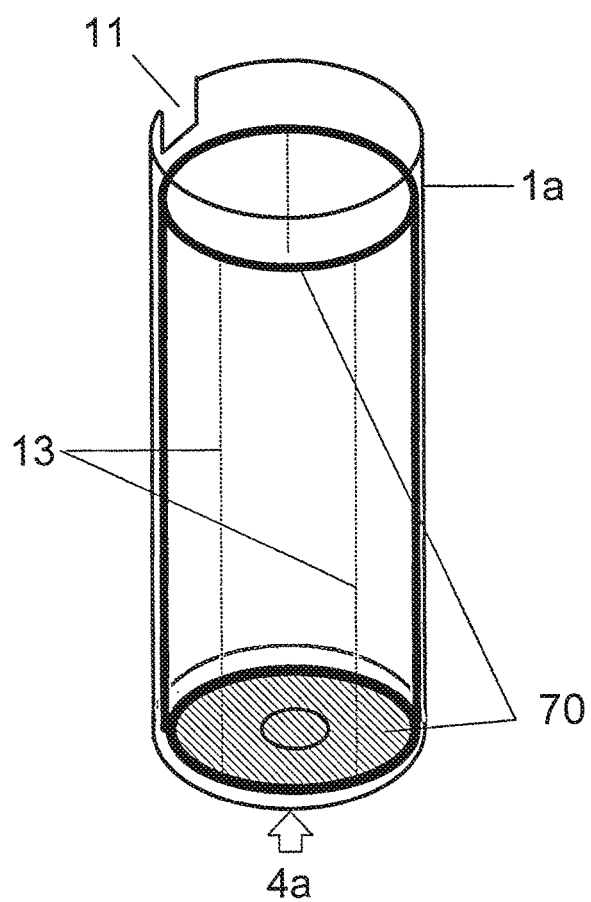

The parachute container 77, which houses the emergency parachute 3, can be designed in several variants:
Multi-capsule system (FIG. 3) 7c having offset sliding rings (FIG. 1) 6; (FIG. 3) 6
Complete polyethylene adapted packaging system (FIG. 4) 70 having predetermined break points (FIG. 4) 13.
A safe and compact transport away from the damaged aerial vehicle is provided in both cases. This precludes jamming when deploying the rescue capsules.

The central cord 2a, which is fastened to the emergency parachute 3 and the wire ropes of the aerial vehicle, is freely positioned on the system under the container section (FIG. 3) 11 adapted for this purpose so that this central cord 2a is automatically released immediately with the ejection or deployment of the parachute rescue system.

REFERENCE NUMBERS

1 Container hood
1a Compressed air container
2a Central cord
2b Auxiliary parachute
3 Emergency parachute
4 Pressure cylinder
4a Compressed air
5 Compressed air bottle outlet opening
5a Control valve
6 Offset sliding rings
7c Multi-capsule system
8 Pulling force
9 Air streaming in
11 Container section
13 Predetermined break point
14 Aerial vehicle
15 Data logger
16 Manual release
20 Rescue capsule
70 Packing system
77 Parachute container
a) Resting state
b) Activating the system
c) Opening emergency parachute
d) Flight direction
e) Inflow

The invention claimed is:

1. A method for an intelligent parachute rescue system for manned and unmanned aerial vehicles, comprising:
sensing flight and engine data of an aerial vehicle;
evaluating the flight and engine data with a data logger; and
causing activation of a parachute container based on the evaluated flight and engine data by controlling a flow of compressed air from a pressure cylinder into the parachute container, thereby deploying an emergency parachute disposed within the parachute container in a controlled manner, wherein deploying the emergency parachute includes
releasing an auxiliary parachute arranged on top of the emergency parachute and
using a pulling force generated by the auxiliary parachute to tighten the emergency parachute.

2. The method according to claim 1, wherein the activation of the parachute container is triggered by a wireless remote transmission.

3. An intelligent parachute rescue system for manned and unmanned aerial vehicles, comprising
a parachute container comprising a rescue capsule having an emergency parachute and an auxiliary parachute, the rescue capsule being provided in a compressed air container of the parachute container with the auxiliary parachute being arranged on top of the emergency parachute;
a pressure cylinder filled with compressed air, the pressure cylinder being connected to the parachute container; and
a control valve arranged between the pressure cylinder and the compressed air container of the parachute container through which the compressed air can selectively flow from the pressure cylinder into the compressed air container.

4. The system according to claim 3, wherein the system is activated by opening the control valve, causing compressed air to flow from the pressure cylinder into the parachute container.

5. The system according to claim 3,
wherein the rescue capsule is a multi-part, non-tightly closed capsule, with a plurality of sliding rings, and
wherein the parachute container is adapted to deploy the rescue capsule by compressed air.

6. The system according to claim 3, wherein the emergency parachute is integrated into the parachute container by an adjoining flexible, slidable packaging system which comprises predetermined break points.

7. The system according to claim 3, wherein the auxiliary parachute includes a tensioned internal expansion spring.

* * * * *